Dec. 29, 1931. W. A. LOTH 1,839,106
APPARATUS FOR PERFORMING METALLURGICAL, SMELTING,
AND MOLDING OPERATIONS
Filed July 2, 1928 2 Sheets-Sheet 1

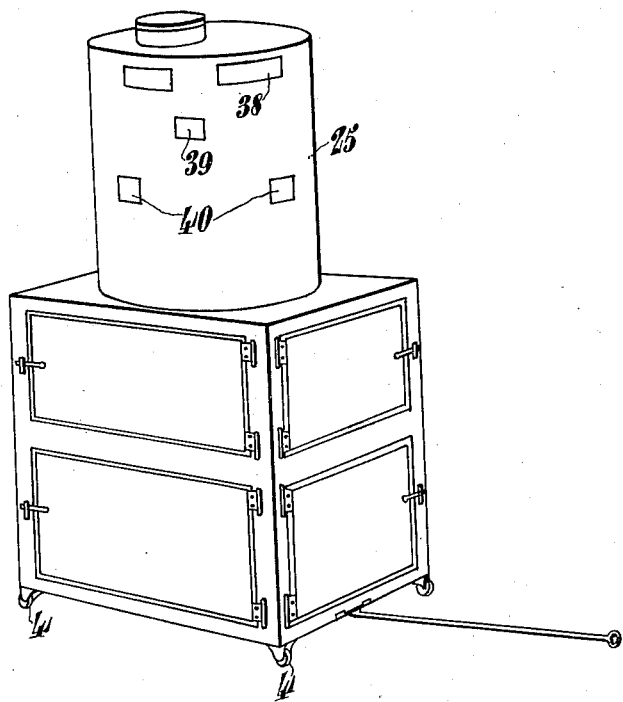

Patented Dec. 29, 1931

1,839,106

UNITED STATES PATENT OFFICE

WILLIAM ARTHUR LOTH, OF PARIS, FRANCE

APPARATUS FOR PERFORMING METALLURGICAL, SMELTING, AND MOLDING OPERATIONS

Application filed July 2, 1928, Serial No. 289,931, and in France July 21, 1927.

The present invention concerns a method for performing metallurgical, smelting and molding operations, mainly applicable to the technics used in smelting any metals and, generally speaking, and fusible and moldable materials.

This method is essentially characterized in that the metallurgical, smelting and molding operations are effected within an enclosure in which is created an artificial atmosphere of any desired composition and the temperature and pressure of which may be regulated at will.

The accompanying drawings illustrate, by way of example only, a form of construction of a plant to carry out the method forming the subject-matter of the invention and more particularly adapted for molding articles made of pig-iron of any nature.

Fig. 2 is, on a smaller scale, a perspective view of the entire plant.

Figure 1:
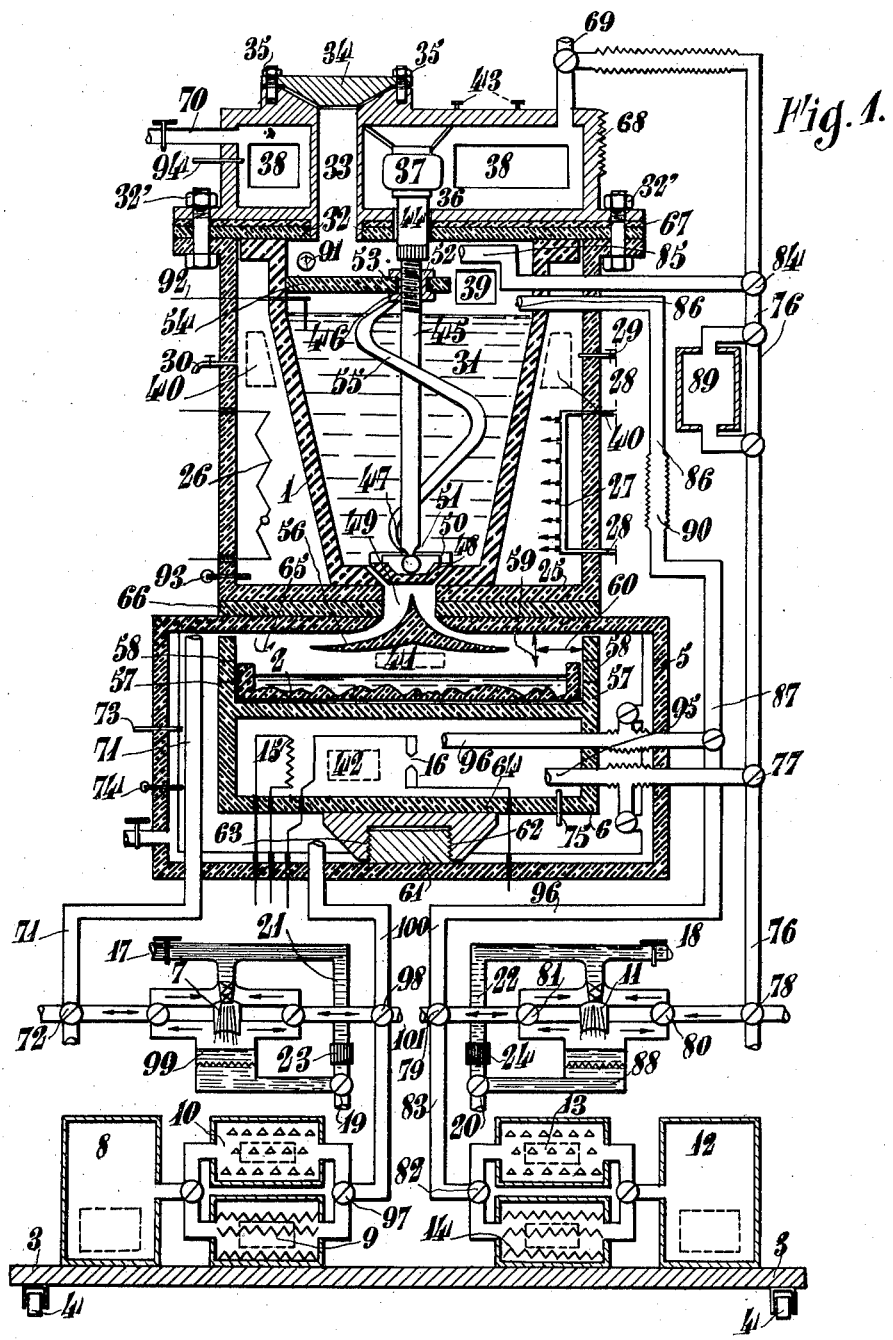
Fig. 1 is a diagrammatic view, with vertical sections, of the entire plant mounted on a movable platform.

The plant in which the pig-iron is placed serves both as foundry ladle and crucible and can give, at will, near the blast-furnace itself, a re-melted pig-iron. The plant devised in the form of a movable apparatus can also be placed near a cupola furnace, a reverberatory furnace or a crucible. Once in the apparatus, in the desired atmosphere, at the required partial vacuum and temperature, the pig-iron is sent without shock in molds which are themselves in the desired atmosphere and at the required partial vacuum and temperature. Subsequently, the atmosphere, pressure and temperature are independently varied and combined for the purpose in view.

The apparatus may be of any size, that is to say of a size suited to the dimension of the articles to be molded on the one hand, and to the number of these articles on the other hand. The smelting and molding apparatus illustrated in Fig. 1, comprises only a single furnace, crucible and ladel 1 and a single mold 2 made of earth, sand, melted quartz or any other material. It is obvious that several crucible-ladles 1 and several molds 2 can be grouped, at will, on one and the same apparatus. Likewise, several apparatus such as that illustrated might be grouped according to any desired combinations, without altering the principle of realization, or the object sought for. In the example illustrated, the plant is devised in the form of a movable apparatus placed on a platform mounted on wheels and capable of moving on the ground or of running on rails.

1 designates a crucible in which is placed either the material to be melted with the suitable ingredients, or a pig-iron (first smelting) in the form of pigs, for instance, or in any other form. Also liquid pig-iron (first smelting) or a refined pig-iron (second smelting) may be used, coming from a cupola furnace, reverberatory furnace, or crucible, or generally speaking any kind of pig-iron or steel. This crucible is placed in a furnace 5 having single or multiple walls, which may contain, a second furnace 6 (having single or multiple walls) on which rests the mold or molds 2. An apparatus for creating variations of pressure, a vacuum-producing apparatus for instance, such as a funnel or group of single or double-acting funnels 7 may be used, for sucking the fluid contained in the furnace 5 and to create therein an atmosphere having any desired pressure and temperature. The funnel 7 or group of funnels in parallel or in series can suck in the atmosphere 8 through heating chambers 9 (diagrammatically illustrated by an electric resistance) or cooling chamber 10 (diagrammatically illustrated by blocks of ice).

Another funnel 11, or a group of funnels, creates suction either in the furnace 6, or in the chamber 12 and through the cooling chambers 13 or heating chamber 14. The chamber-furnace 6 contains heating means of any kind, diagrammatically illustrated in Fig. 1 by a resistance 15 and an electric arc 16 with their supply circuits. It is obvious that the number of funnels may be reduced to a single one, or they may be connected or combined in any way and that they may be of any design whatever. The best results are obtained with a double-acting funnel, with highly divergent jets when issuing from the nozzle, and for instance funnels provided with screw propellers or with helical striæ of suitable pitch. These funnels may obviously be traversed by any fluid suited for the atmosphere to be created, acting only mechanically, physically (as by solubility) or chemically (as by combination). These fluids may have open circuits and for instance, may enter through openings 17 and 18 and issue through other openings 19 and 20, or they may have closed circuits, these fluids then passing through the pipes 21 and 22 and being put in motion by the motors 23 and 24.

The crucible-furnace 1 is placed in a furnace 25, having single or multiple walls, allowing circulation of gases having variable temperatures, and heated in any suitable manner. In Fig. 1, the heating, adjustable at will, is diagrammatically illustrated by an electric resistance 26 and by a perforated gas pipe 27, fed by the pipe 28, the cock 29 allowing the entrance of the fuel and the cock 30 the issue of the gases, for instance. It will be noted that this furnace 25 is without communication with the bath 31 contained in the tank 1. A cover 32 prevents, by means of a suitable system of closure, such as bolts 32', any communication between the atmosphere of the furnace 25 and that existing above the bath 31 contained in the tank 1. The cover 32 has a conduit 33 provided with an obturator 34, secured by any suitable means such as bolts 35 for instance, and through which the tank 1 may be fed by any desired cast-iron bath. In the cover is provided a chamber 36 within which is arranged a driving mechanism 37 capable of rotating in any direction. Peep holes 38, with transparent quartz for instance, permit inspection of the chamber 36. Other peep holes 39 and 40 allow likewise respectively inspection of the tank 1 and the furnace 25. Finally peep holes 41 and 42 also allow inspection of furnaces 5 and 6, whilst peep holes are likewise provided for the chambers 8, 9, 10 and 12, 13, 14 and on the funnels 7 and 11 and their tanks.

The driving mechanism 37 is actuated by any suitable source of power and for instance by the electric circuit 43. It revolves a six-sided tube 44 in the cover 32. This six-sided tube is angularly connected to a rod 45 which can, however, freely slide relatively to it. This rod 45, provided with helical inclines 46, passes through the bath 31 of the tank 1 and its end 47 fits in a fork piece provided on a valve 48 controlling an opening 49 in the bottom of the tank 1. The valve 48 is provided with claws for retaining a plate 50 held in the groove 51 of the rod 45. At its upper part, the rod 45 is held by a member or nut 52 provided with female inclines corresponding to the inclines 46 and immobilized in translation by engagement of a groove 53 in a member 54 secured on the tank 1 for instance. It will immediately be seen that if the driving mechanism 37 rotates in one direction, the rod 45 freely rotates in the same direction and as this rod carries a stirrer, diagrammatically illustrated in Fig. 1 by a screw propeller 55, the latter stirs the bath 31 contained in the tank 1. If, on the contrary, the driving mechanism 37 rotates in the reverse direction, the rod 45 tends to be driven in the reverse direction; the screw threaded member 52 held in the member 54, acts as a nut and the rod 45 vertically moves by sliding in the tube 44; the valve 48 is lifted from its seat, allowing the bath 31 of the tank 1 to flow away through the opening 49. The content of the bath falls on the spreader 56 which distributes it in the mold 2 supported by the chamber 6 and is contained in a vat of variable height formed by walls 57, 58, etc., mutually fitting in each other and providing for any desired height for the purpose of obtaining, when desired, a casting direct from the source. In this case, with a spreader of suitable dimensions, the content of the bath falls in the vat formed by the parts 57, 58, etc. fitted in each other and falls into the mold. It is to be noted that the mold or molds 2 may receive any desired movement and, as indicated by the arrow 59 or the arrow 60, or according to the resultant of these two indicated movements. The rising movement necessary for obtaining a proper molding without shocks can, for instance, be obtained by means of a rod 61 screw threaded at 62 and screwed in an internally threaded tube 63 constituting a support-nut for the platform 64 on which rest the furnace 6 and the mold 2. It is also possible, during molding, to impart to the mold 2 a movement of rotation in the direction of the arrow 65 or in the reverse direction. The crucibles, furnaces, etc., are of course constructed by means of suitable materials: plumbago, refractory brick, graphite, quartz, etc., and have single or multiple walls with, if necessary, circulation between these walls of fluid at a predetermined temperature. The furnace 25 is conveniently separated from the furnace 5 by a layer 66 of any suitable heat insulating material. Likewise between the two parts of the cover 32 is interposed, at 67, a layer of heat insulating material. The cover is provided with any desired cooling device, diagrammatically illustrated in Fig. 1 by vanes 68. Finally two cocks 69 and 70 are provided on the cover 32 and can be connected, by distortable conduits, to the funnels 7 and 11 for creating, in the chamber 36, any desired circulation of fluid.

The apparatus described can be used in the following manners:

1. Drying: If use is made of molds formed of cast-iron or of quartz, there is obviously no need of drying. It suffices to raise the temperature. But, in the case of molds adapted to be dried in a drying oven (sand molds), these molds are introduced in the furnace 5 through a door which subsequently is hermetically closed. These molds are laid on the furnace 6. The funnel 7 is started for sucking through the conduit 71, the key 72 being open. The furnace is then progressively heated by means of thermic sources diagrammatically illustrated at 15 and 16. The increasing temperatures to which the molds to be dried are raised are constantly indicated by a thermometer 73, so that they may be caused to vary according to any desired law. The vacuum created by the funnel 7 is indicated by a pressure gauge 74; the temperature of the furnace 6 is indicated by a thermometer 75. It is obvious that it might be possible, by proceeding in the same manner, to heat molds made of cast-iron or quartz in a rarefied atmosphere. For the dried molds, it is possible, by proceeding as just stated, to obtain the required degree of moisture of dryness and the favorable porosity, whilst accelerating the evolution of the air or gases contained in the sand.

2. Smelting: Before, or after, drying of the mold, the furnace 25 can be heated by heating means such as those diagrammatically illustrated by the resistance 26 and the perforated pipe 27. The entire cover 32 or simply its lower half can be left in position. When the furnace is at the required temperature, in the tank 1 are introduced either the products necessary for obtaining the bath 31, or any cast-iron bath, of first or second smelting, and coming from any suitable source (cupola furnace, reverberatory furnace or crucible). If necessary, the bath may be fed with special products or with another bath. The cover 32 being placed in position and bolted as well as the obturator 34, the driving mechanism 37 is started for stirring the mixture. The funnel 71 is put in action and the keys 77 and 78 being opened, this funnel, through the pipe 76, creates vacuum above the bath 31 by driving back the fluids sucked through the conduit 79 for instance. The position of the keys 78, 79, 80 is inverted and the chosen fluid is sucked into the chamber 12 by causing this fluid to pass through the heating chamber 14, the key 82, the conduit 83, the key 79, for sending it, through the funnel 11, the key 80, the key 78, the conduit 76, the key 77, the key 84, and the conduit 85, above the bath 31. This being done, the suction is cut off at 12 by means of the key 79 and the suction is caused to communicate with the conduit 86 for instance. The fluids, which constitute the atmosphere above the bath 31, are thus sucked through the conduit 86, the keys 87, 79 and 81 and pass into the funnel 11, the tank 88, the keys 80 and 78 and are sent through the conduit 76, the key 77, in a chamber 89 (regeneration or charge) or pass through the conduit 76 and the conduit 85, the chamber above the bath 31, for reaching the conduit 86 and beginning over again the circuit which has just been described.

Vacuum may then be again created as well as the desired atmosphere for causing the latter to circulate, at will, with or without regeneration. Of course, the driving fluid which passes through the funnel 11 is suited to the result sought and can be either active, or neutral. This fluid may, moreover, whatever its composition may be, be brought to any desired temperatures, by any suitable heating or cooling means, preferably removable means, diagrammatically illustrated in Fig. 1 by vanes 90. Profit may thus be derived from the advantages resulting from the creation, for certain cast-iron or certain metallurgical or other products, of special atmospheres. When the desired product is obtained, it can be collected in the furnace 31. For that purpose, the cover 32 is removed and the tank 1 is withdrawn and can be rocked and emptied in ladles or vats. Ladles or vats may also be placed under the orifice 49 through which the bath 31 may flow away when the valve 48 is open. If the bath 31 is adapted for the production of molded articles, it suffices to place the molds under the tap-hole 49.

Thus, for instance, assuming that the bath 31 is a cast-iron bath intended for molding various articles, the stirrer 55 is stopped after the bath has remained the necessary time in the chosen atmosphere, at the temperature and pressure adopted, and which are respectively indicated by the thermometers 93 and 94, the double thermometer 92 and the pressure gauge 91. The driving mechanism 37 is then started in the direction corresponding to the upward movement of the rod 45; the valve 48 lifts according to a height indicated by a suitable graduation of the rod 45 above the nut 52 and visible through apertures 39. The content of the bath flows through the orifice 49 and falls on the spreader 56 which distributes it on the mold 2 or in the enclosure constituted by the parts 57, 58, etc. fitted in each other, in the case of molding direct from the source. The bath 31 thus fills the prepared molds maintained at a predetermined temperature and in a fluid having a predetermined pressure. The casting and molding can be effected in vacuum. The temperature of the furnace 6 on which rest the mold or molds 2 is then caused to vary by acting on the heating means as already explained. The cooling of the molded article takes place in vacuum, and at the desired speed, so that it is possible, by acting on the latter factor, to obtain a cast-iron having any required quality and property. If it is desired to obtain a sudden cooling, for obtaining for instance a hardened cast-iron, it suffices to cause the funnel 11 to suck in an atmosphere 12 for instance through a cooling medium 13, a key 82, a pipe 83, keys 79 and 81 and to drive back the atmosphere thus cooled through the vat 88, the key 80 and 78, the conduit 76, the key 77, the conduit 95 and the furnace previously put out, and between the walls of the furnace 6 the atmosphere of which borrows the calories before issuing through the conduit 96, the key 87 and the double key 79. The rate of cooling remains therefore always under control.

When desired, the degree of vacuum in the chamber 5 alone may be reduced and the molding proceeded with and terminated in the chosen atmosphere and at the required pressure. For that purpose, it suffices to put the funnel 7 in action and to cause it to suck in the atmosphere 8, for instance, through a cooling mixture 10, or heating means 9. The fluids, which pass through the key 97, the key 98 and the funnel 7 are sent back, through the vat 99, the key 72, the conduit 71, into the furnace 6, from which they can be driven off through the conduit 100, the double cock 98 and the opening 101. By completely closing the cock or key 98, the molding proceeds in the atmosphere chosen and under pressure, the temperature being modified according to any desired law. It is obvious, according to the examples of utilization which have just been described that it is possible, by means of sets of cocks arranged on all suitable conduit lines, to modify the atmosphere in which take place the casting or cooling of a molded cast-iron, and to vary, according to any predetermined law, the two factors: pressure and temperature.

Fig. 2 is an external perspective view of the plant for carrying out the process forming the subject matter of the invention. This plant is established under the form of an apparatus mounted on a movable platform and capable, consequently, of being easily conveyed near a cupola furnace, a furnace, etc. This apparatus is obviously only an example of realization to which the invention is not limited, which latter, whatever may be its forms of construction, and its applications, remains simply defined by the essential features set forth in the preamble to the present specification.

Having now particularly described and ascertained the nature of my said invention and in what manner the same is to be performed, I declare that what I claim is:—

1. In an apparatus of the class described, the combination of a furnace, a crucible within the furnace, means for filling said crucible with casting material, a chamber below said furnace communicating with it, a mold within said chamber, an axial rod having its upper end screw threaded within said crucible, means mounted on the rod to stir the contents of the crucible, a pivoted valve at the lower end of said rod controlling the aperture between said crucible and said chamber, a nut on the threaded portion of said rod, a head fastened on the upper end of said rod, means for rotating said rod in opposite directions in such a manner that the rod in one direction rotates about the axis of said nut, and when rotating in the other direction, the rod causes said valve to close the aperture between the chamber and the crucible.

2. In an apparatus of the class described, the combination of a furnace, a crucible within the said furnace, means for filling said crucible with casting material, a chamber below said furnace communicating with it, a mold within said chamber, an atmospheric chamber, a fluid circuit connecting the said atmospheric chamber respectively with said furnace and said molding chamber, a funnel in said circuit and a heating chamber and a frigorific chamber in said circuit.

3. In an apparatus of the class described, the combination of a furnace, a crucible in the furnace, means for filling said crucible with casting material, a chamber below said furnace communicating with it, a mold within said chamber, an axial rod having its upper end screw threaded within said crucible, means mounted on the rod to stir the contents of the crucible, a pivoted valve at the lower end of said rod controlling the aperture between said crucible and said chamber, a nut on the threaded portion of said rod, a head fastened on the upper end of said rod, means for rotating said rod in opposite directions in such a manner that, the rod in one direction rotates about the axis of said nut, and when rotating in the other direction, the rod causes said valve to close said aperture between the chamber and the crucible; an atmospheric chamber, a fluid circuit connecting said atmospheric chamber respectively with said furnace and said molding chamber, a funnel on the said circuit and a heating chamber and a frigorific chamber in said circuit.

In testimony whereof I have signed my name to this specification.

WILLIAM ARTHUR LOTH.